US012661899B2

(12) United States Patent
Hayashi et al.

(10) Patent No.: US 12,661,899 B2
(45) Date of Patent: Jun. 23, 2026

(54) CARTRIDGE, SYSTEM, AND CARTRIDGE SET

(71) Applicant: BROTHER KOGYO KABUSHIKI KAISHA, Nagoya (JP)

(72) Inventors: Masahiro Hayashi, Anjo (JP); Naoya Okazaki, Hashima (JP); Yuma Tanabe, Nagoya (JP); Satoru Oki, Nagoya (JP); Yuji Fukuta, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 43 days.

(21) Appl. No.: 18/475,860

(22) Filed: Sep. 27, 2023

(65) Prior Publication Data

US 2024/0100846 A1 Mar. 28, 2024

(30) Foreign Application Priority Data

Sep. 28, 2022 (JP) ................................ 2022-154334

(51) Int. Cl.
*B41J 2/175* (2006.01)
*B41J 2/21* (2006.01)

(52) U.S. Cl.
CPC ....... *B41J 2/17543* (2013.01); *B41J 2/17553* (2013.01); *B41J 2/21* (2013.01)

(58) Field of Classification Search
CPC ...... B41J 2/17543; B41J 2/17553; B41J 2/21; B41J 2/1752; B41J 2/17503
USPC .......................................................... 347/86
See application file for complete search history.

(56) References Cited

U.S. PATENT DOCUMENTS

| | | | |
|---|---|---|---|
| 5,506,611 | A | 4/1996 | Ujita |
| 2004/0021751 | A1 | 2/2004 | Steinmetz et al. |
| 2004/0119798 | A1 | 6/2004 | Nakamura et al. |
| 2005/0134663 | A1 | 6/2005 | Sasaki |
| 2005/0146577 | A1 | 7/2005 | Sasaki |
| 2005/0146578 | A1 | 7/2005 | Takagi |
| 2005/0146579 | A1 | 7/2005 | Sasaki |
| 2005/0151812 | A1 | 7/2005 | Sasaki |
| 2005/0195225 | A1 | 9/2005 | Takagi |
| 2014/0192119 | A1 | 7/2014 | Boyd |

(Continued)

FOREIGN PATENT DOCUMENTS

| | | | |
|---|---|---|---|
| EP | 1 284 193 | A2 | 2/2003 |
| JP | H03-067657 | A | 3/1991 |

(Continued)

OTHER PUBLICATIONS

Extended European Search Report issued in corresponding European Application No. 23200573.6, Feb. 26, 2024.

*Primary Examiner* — Jason S Uhlenhake
(74) *Attorney, Agent, or Firm* — Merchant & Gould P.C.

(57) ABSTRACT

A cartridge configured to be inserted in a first direction into a case having a plurality of engagement portions is provided. The cartridge has a body and a key member. The body has a chamber for storing a printing agent. The key member is located on the body at a position associated with a type of the printing agent stored in the chamber and is configured to engage with a corresponding one of the plurality of engagement portions of the case. The key member has a surface facing a second direction opposite to the first direction. The surface is configured to contact the corresponding one of the plurality of engagement portions.

16 Claims, 8 Drawing Sheets

(56) References Cited

U.S. PATENT DOCUMENTS

| | | | | |
|---|---|---|---|---|
| 2018/0093484 | A1* | 4/2018 | Nukui | B41J 2/17503 |
| 2018/0093485 | A1* | 4/2018 | Takahashi | B41J 2/17526 |
| 2018/0178534 | A1 | 6/2018 | Nukui et al. | |
| 2020/0276821 | A1 | 9/2020 | Aoki et al. | |
| 2021/0031536 | A1* | 2/2021 | Ishizawa | B41J 2/17536 |
| 2022/0097389 | A1 | 3/2022 | Oya et al. | |
| 2022/0169030 | A1 | 6/2022 | Maruyama et al. | |

FOREIGN PATENT DOCUMENTS

| | | | |
|---|---|---|---|
| JP | H08-150728 | A | 6/1996 |
| JP | H10-086408 | A | 4/1998 |
| JP | 2005-254734 | A | 9/2005 |

* cited by examiner

CARTRIDGE, SYSTEM, AND CARTRIDGE SET

REFERENCE TO RELATED APPLICATIONS

This application claims priority from Japanese Patent Application No. 2022-154334 filed on Sep. 28, 2022. The entire content of the priority application is incorporated herein by reference.

BACKGROUND ART

A single-color ink cartridge, in which an ink in a single color is packed, and a multi-color ink cartridge, in which inks in multiple colors of magenta, cyan, yellow, and black are packed, are known. An operator of an apparatus may visually recognize which one of the ink cartridges is mounted in a cartridge case in the apparatus through a transparent window in the apparatus. Through the transparent window, the operator may recognize whether the ink cartridge is located at a correct position in the apparatus, and thereby the apparatus may be restrained from operating with the cartridge located at an incorrect position.

DESCRIPTION

However, the operator may not recognize that the cartridge is located at an incorrect position at the moment when the operator is mounting the cartridge in the cartridge case.

The present disclosure is advantageous in that a cartridge, a cartridge, which may enable an operator to recognize that the cartridge is located at a correct position in the apparatus immediately when the operator is mounting the cartridge in the apparatus, is provided.

Figure 1:
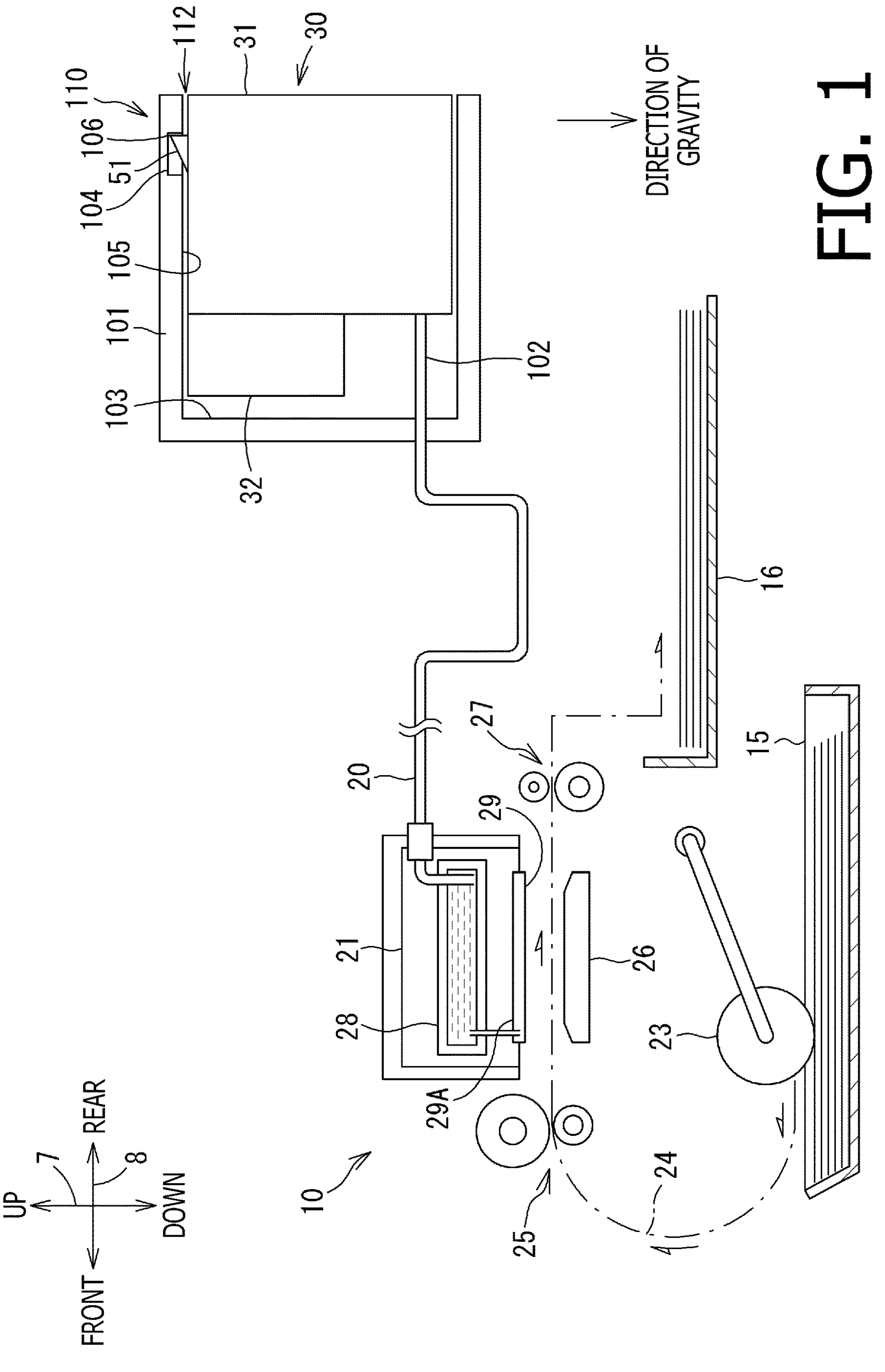
FIG. 1 is a schematic cross-sectional view of an internal structure of a printer 10.

In the following paragraphs, embodiments of the present disclosure will be described with reference to the accompanying drawings. It is noted that an ink cartridge 30 described below is merely an exemplary embodiment of the present disclosure, and various connections may be set forth between elements in the following description. These connections in general and, unless specified otherwise, may be direct or indirect and that this specification is not intended to be limiting in this respect.

In the following paragraphs, the ink cartridge 30 is movable to be mounted in and demounted from a cartridge-mountable compartment 110 along a horizontal direction, i.e., a direction intersecting orthogonally with the direction of gravity. Further, whenever appropriate, a frontward direction and a rearward direction may be collectively referred to as a front-rear direction 8. An upward direction and a downward direction may be collectively referred to as an up-down direction 7, which is an example of second intersecting direction, vertical direction, and height direction. A rightward direction and a leftward direction may be collectively referred to as a right-left direction 9. Therefore, the front-rear direction 8 and the right-left direction 9, which is an example of first intersecting direction and of width direction, may be understood as the horizontal direction. Meanwhile, the up-down direction 7 may be defined as directions vertically intersecting with the front-rear direction 8. Moreover, in the following paragraphs, a state where the ink cartridge 30 is mounted in the cartridge-mountable compartment 110 and usable, may be equal to a state, in which the ink cartridge 30 inserted in the cartridge-mountable compartment 110 is located at a mounted position. The mounted position is a position, at which an ink needle 102 located in the cartridge-mountable compartment 110 is coupled with a supply port 47 of the ink cartridge 30. In the following paragraphs, further, a mounted position of the ink cartridge 30, in the state where the ink cartridge 30 is mounted in the cartridge-mountable compartment 110 and usable, may also be called a usable position.

In the following paragraphs, furthermore, a term “frontward” may mean a direction, in which the ink cartridge 30 is inserted into the cartridge-mountable compartment 110 along the front-rear direction 8, and the frontward direction in the present embodiment is an example of first direction. A term “rearward” may mean a direction, in which the ink cartridge 30 is removed from the cartridge-mountable compartment 110 along the front-rear direction 8, and the rearward direction in the present embodiment is an example of second direction. An expression “face frontward” may mean facing a direction, which includes a frontward component, and an expression “face rearward” may mean facing a direction, which includes a rearward component. An expression “face downward” may mean facing a direction, which includes a downward component, and an expression “face upward” may mean facing a direction, which includes an upward component. For example, a phrase “a front surface faces frontward” may mean not only that the front surface faces frontward but also that the front surface faces toward a side in a direction slanting with resect the frontward direction.

Overall Configuration of Printer 10

As shown in FIG. 1, a printer 10 being an example of system is an image forming apparatus in an inkjet recording method, which may record images on a sheet by discharging ink droplets at the sheet, and may be, for example, an inkjet printer. The printer 10 has the cartridge-mountable compartment 110, which is an example of case. In the cartridge-mountable compartment 110, the ink cartridge 30 being an example of cartridge is mountable. The cartridge-mountable compartment 110 has an opening 112, which is formed on one side of the cartridge-mountable compartment 110. The ink cartridge 30 may be inserted frontward through the opening 112 into the cartridge-mountable compartment 110 and pulled rearward through the opening 112 to be removed from the cartridge-mountable compartment 110. FIG. 1 shows the ink cartridge 30 completely mounted in the cartridge-mountable compartment 110. In other words, the ink cartridge 30 in FIG. 1 is in a mounted state. The position of the ink cartridge 30 in the mounted state is the usable position.

The ink cartridge 30 may store liquid being an example of printing agent. For example, the ink cartridge 30 may store a printing agent, e.g., ink, to be used in the printer 10. In the state where the ink cartridge 30 is completely mounted in the cartridge-mountable compartment 110, the ink cartridge 30 and a recording head 21 are connected through an ink tube 20. The recording head 21 may discharge the ink supplied from the ink cartridge 30 through a plurality of nozzles 29. In particular, driving voltages may be applied by a head-controlling board (not shown) in the recording head 21 selectively to a plurality of piezoelectric devices 29A, which are arranged in one-to-one correspondence with the plurality of nozzles 29. Thereby, the ink droplets may be discharged selectively through the nozzles 29. Thus, the recording head 21 may consume the ink contained in the ink cartridge 30, which is mounted in the cartridge-mountable compartment 110.

The printer 10 has a feeder tray 15, a feeder roller 23, a conveyer roller pair 25, a platen 26, an ejection roller pair 27, and an ejection tray 16. The feeder roller 23 may feed a sheet on the feeder tray 15 to a conveyer path 24. The sheet fed to the conveyer path 24 may reach the conveyer roller pair 25. The conveyer roller pair 25 may convey the sheet reaching the conveyer roller pair 25 to an upper side of the platen 26. The recording head 21 may discharge the ink selectively at the sheet being conveyed to the platen 26. Thereby, an image may be recorded on the sheet. The sheet passing over the platen 26 may reach the ejection roller pair 27. The ejection roller pair 27 may eject the sheet reaching the ejection roller pair 27 at the ejection tray 16, which is located at a most downstream position in the conveyer path 24.

Cartridge-Mountable Compartment 110

As shown in FIG. 1, the cartridge-mountable compartment 110 has a cartridge case 101, the ink needle 102, and a recess 104. The recess 104 is an example of engagement portion. The cartridge-mountable compartment 110 may accommodate the ink cartridge 30.

As shown in FIG. 1, the cartridge case 101 has a shape of a box.

The ink needle 102 is in a tubular shape and is located at a lower position in an end surface 103 of the cartridge case 101. The ink needle 102 is located at a position corresponding to the supply port 47 (see FIG. 2) of the ink cartridge 30 mounted in the cartridge-mountable compartment 110. The ink needle 102 protrudes from the end surface 103 of the cartridge case 101 along the front-rear direction 8, and a tip of the ink needle 102 is open rearward. The tip of the ink needle 102 may have either a plane or pointy shape.

The recess 104 has a cavity recessed upward from a ceiling 105 of the cartridge case 101 at a position in vicinity of the opening 112. The recess 104 is located at a position corresponding to a key member 51 of the ink cartridge 30 inserted in the cartridge-mountable compartment 110. While the ink cartridge 30 is mounted in the cartridge-mountable compartment 110, a wall surface 106, which is one of wall surfaces defining the recess 104 that faces frontward, may contact a rearward surface of the key member 51. With the wall surface 106 contacting the key member 51 from the rear side, the ink cartridge 30 may stay mounted in the cartridge-mountable compartment 110 without moving rearward.

Ink Cartridge 30

Figure 2:
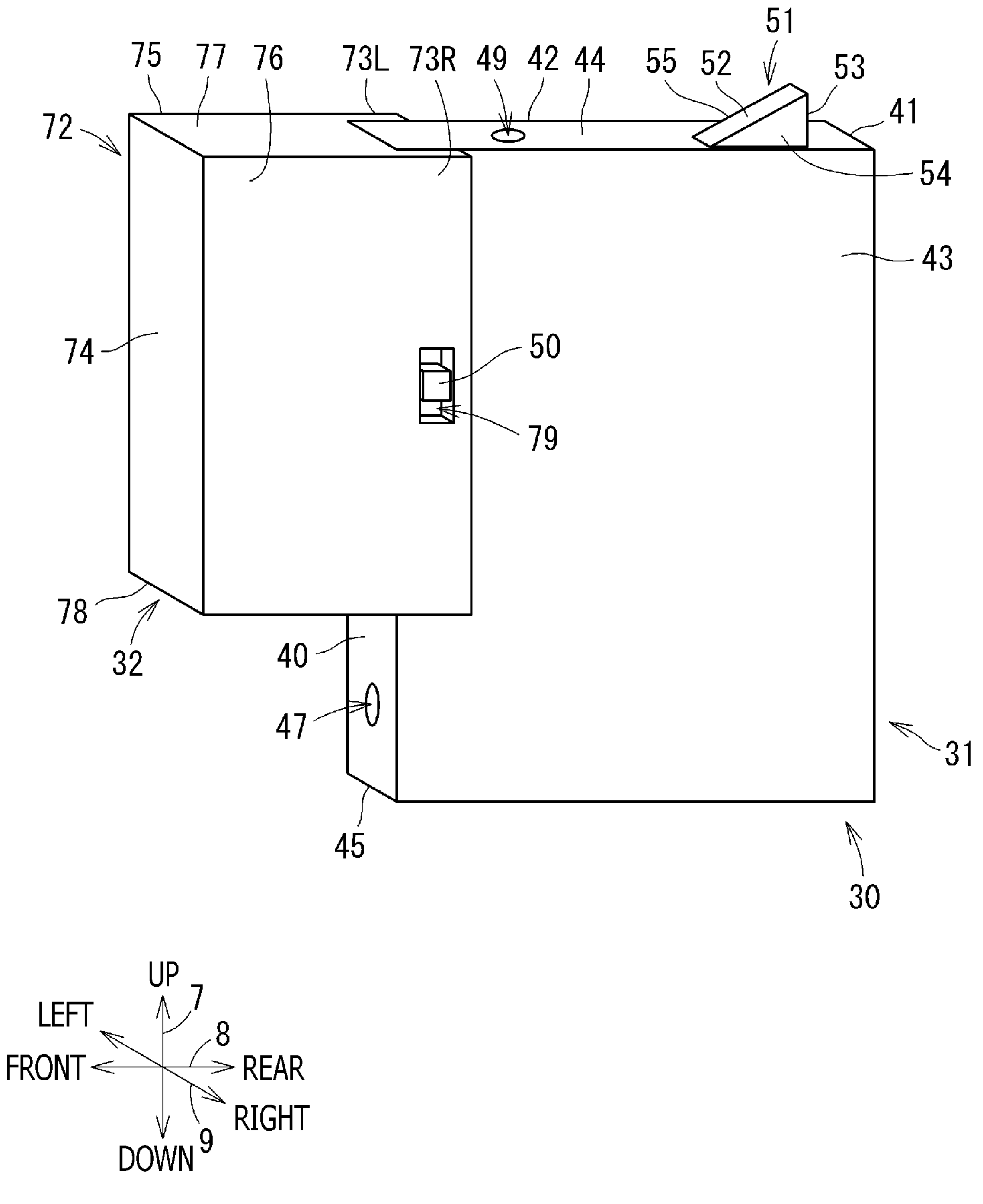
FIG. 2 is a perspective view of an ink cartridge 30.

The ink cartridge 30 is a container to store liquid, e.g., the ink. As shown in FIG. 2, the ink cartridge 30 has a body 31 and a cover 32.

As shown in FIG. 2, the body 31 has a thin parallelepiped shape. The body 31 has a dimension in the right-left direction 9 which is smaller than dimensions thereof in the up-down direction 7 and in the front-rear direction 8.

The body 31 has a front wall 40, a rear wall 41 facing the front wall 40 in the front-rear direction 8, a leftward wall 42 continuous with the front wall 40 and the rear wall 41, a rightward wall 43 facing the leftward wall 42 in the right-left direction 9, an upper wall 44 continuous with the front wall 40 and the rear wall 41, and a lower wall 45 facing the upper wall 44 in the up-down direction 7. An outer surface of the front wall 40 faces frontward. An outer surface of the rear wall 41 faces rearward. An outer surface of the leftward wall 42 faces leftward. An outer surface of the rightward wall 43 faces rightward. An outer surface of the upper wall 44 faces upward. An outer surface of the lower wall 45 faces downward.

The front wall 40, the rear wall 41, the leftward wall 42, the rightward wall 43, the upper wall 44, and the lower wall 45 define a chamber 46 in a space inside the body 31. The chamber 46 is located between the front wall 40 and the rear wall 41. The front wall 40, the rear wall 41, the leftward wall 42, the rightward wall 43, the upper wall 44, and the lower wall 45 are substantially translucent such that an operator may visually recognize a liquid surface of the ink contained in the chamber 46 from outside. The body 31 may be formed integrally in one piece. The body 31 is made of resin, for example, synthetic resin.

The supply port 47 is positioned at a lower portion of the front wall 40. In the present embodiment, the supply port 47 is open externally. The supply port 47 is open frontward. In other words, the supply port 47 is open in the front-rear direction 8. Optionally, the ink cartridge 30 may have a closing member (not shown) to close the supply port 47. The closing member may close the supply port 47 in a state where the ink cartridge 30 is not mounted in the cartridge-mountable compartment 110 but may open the supply port 47 in a state where the ink cartridge 30 is mounted in the cartridge-mountable compartment 110. The closing member may be, for example, a sealer that seals the supply port 47. The sealer may be broken by the ink needle 102 to unseal the supply port 47 in a process of mounting the ink cartridge 30 in the cartridge-mountable compartment 110, and the supply port 47 may be enabled to supply the ink in the ink cartridge 30 to the recording head 21 through the ink needle 102. For another example, the closing member may be a valve (not shown) that may close the supply port 47. The valve may be movable between a position to close the supply port 47 and a position to open the supply port 47. The valve may contact the ink needle 102 and separate from the supply port 47 in a process of mounting the ink cartridge 30 in the cartridge-mountable compartment 110, and thereby the supply port 47 may be enabled to supply the ink in the ink cartridge 30 to the recording head 21 through the ink needle 102.

Figure 3:
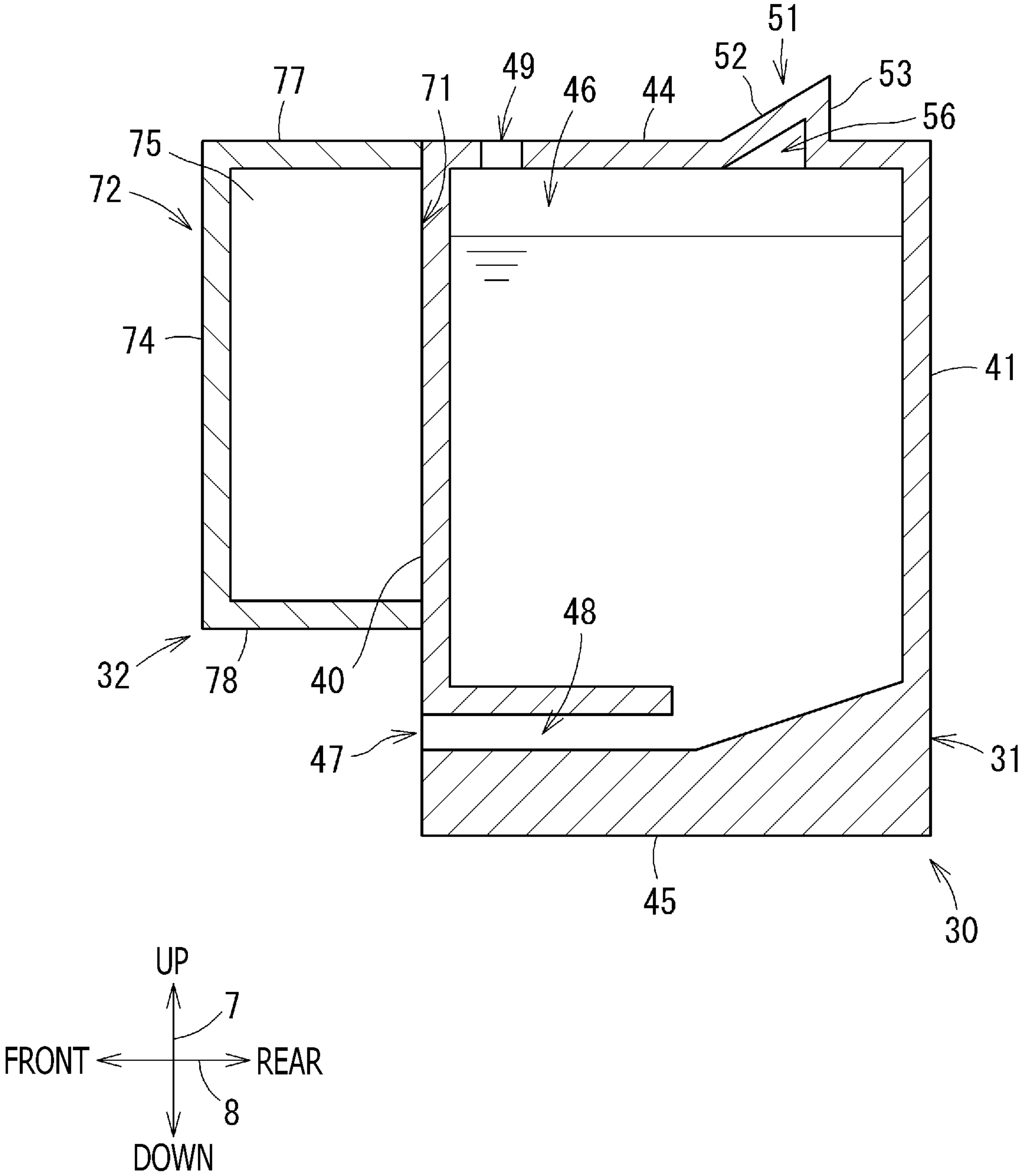
FIG. 3 is a cross-sectional view of the ink cartridge 30.

As shown in FIG. 3, inside the body 31, an ink flow path 48 extends from the supply port 47 along the front-rear direction 8. The ink flow path 48 is continuous with the supply port 47 and a lower end of the chamber 46. In other words, a frontward end of the ink flow path 48 includes the supply port 47. The ink contained in the chamber 46 may flow outward through the ink flow path 48 and from the supply port 47.

The upper wall 44 includes an air release path 49. The air release path 49 is continuous with an upper end of the chamber 46 and the outside of the chamber 46. Through the air release path 49, the air may be exchanged between the outside and the inside of the chamber 46. Through the air release path 49, air pressure of an air layer in the chamber 46 is equated with the atmospheric pressure. The air release path 49 on the outer surface of the upper wall 44 is open upward. Optionally, the air release path 49 may be closable with, for example, a valve, a semi-translucent film, etc.

As shown in FIG. 2, in a frontward end area on the rightward wall 43, a protrusion 50 protrudes rightward from the outer surface of the rightward wall 43. Although not shown in the drawings, a protrusion 50 protrudes leftward from the outer surface of the leftward wall 42 in a frontward end area on the leftward wall 42.

As shown in FIGS. 2 and 3, the key member 51 is located on the outer surface of the upper wall 44. The key member 51 is located rearward with respect to the air release path 49. The key member 51 is located rearward and above the cover 32. The key member 51 is located rearward with respect to the supply port 47. The key member 51 protrudes upward from the outer surface of the upper wall 44. The key member 51 has a slant surface 52, a locking surface 53 facing rearward, a rightward surface 54 facing rightward, and a leftward surface 55 facing leftward. The slant surface 52 and the locking surface 53 are rectangular shapes. The rightward surface 54 and the leftward surface 55 are triangular shapes. The slant surface 52 is slanted with respect to the front-rear direction 8 such that the slant surface 52 extends upward from a front end toward a rear end of the key member 51.

The key member 51 is formed integrally with the body 31. Inner surfaces of the key member 51 define an inner space 56 inside the body 31. The inner space 56 is a space open downward and is continuous with the chamber 46 at the downward end thereof. An upper end of the inner space 56 is located above the upper wall 44 in the mounted position.

The key member 51 is located at a different position in the right-left direction 9 on the upper wall 44 according to, for example, a type of the ink contained in the chamber 46. The type of the ink may be, for example, a color of the ink, composition of the ink, etc. In other words, the key member 51 is located in a particular position on the upper wall 44 associated with a type of the printing agent contained in the chamber 46 of the body 31. The key member 51 of the ink cartridge 30 shown in FIG. 2 is located at a position offset rightward from a center line C (see FIGS. 4A-4C) of the upper wall 44 in the right-left direction 9 such that a center line KC of the key member 51 is located on the right of the center line C of the upper wall 44. Thus, the key member 51 of the ink cartridge 30 is located closer to one side, e.g., a rightward side, of the upper wall 44 than to the other side, e.g., a leftward side, of the upper wall 44. As indicated in a broken line in FIG. 4A, the recess 104 of the cartridge case 101 is located at a position corresponding to the key member 51. Therefore, when the ink cartridge 30 is inserted in the cartridge case 101, the slant surface 52 of the key member 51 may slide against the ceiling 105 of the cartridge-mountable compartment 110 in the vicinity of the opening 112, and a rearward part of the ink cartridge 30 may shift downward as the ink cartridge 30 proceeds frontward. When the slant surface 52 reaches a position frontward with respect to the wall surface 106, the key member 51 may face the recess 104 in the up-down direction 7, the rearward part of the ink cartridge 30 may shift upward, and the key member 51 may enter the recess 104. When the locking surface 53 of the key member 51 and the wall surface 106 of the recess 104 face each other in the front-rear direction 8, the locking surface 53 may contact the wall surface 106. Thus, the key member 51 and the recess 104 are engaged, and the ink cartridge 30 may be maintained in the mounted state.

For example, an ink cartridge 30A, which is different from the ink cartridge 30 in the type of the ink contained therein, has the key member 51 located at a position offset leftward from the center line C of the upper wall 44 in the right-left direction 9 such that a center line KC of the key member 51 is located on the left of the center line C of the upper wall 44. Thus, the key member 51 of the ink cartridge 30A is located closer to the other side, e.g., the leftward side, of the upper wall 44 than to the one side, e.g., the rightward side, of the upper wall 44. A cartridge case 101, in which the ink cartridge 30A may be mounted, has the recess 104 at a position to correspond to the key member 51 at the leftward offset position. Therefore, when the ink cartridge 30A is inserted in the cartridge case 101, the key member 51 and the recess 104 may face each other in the up-down direction 7, and the locking surface 53 may contact the wall surface 106. Therefore, the key member 51 engages with the recess 104, and the ink cartridge 30A may be maintained in the mounted state.

Figure 4C:
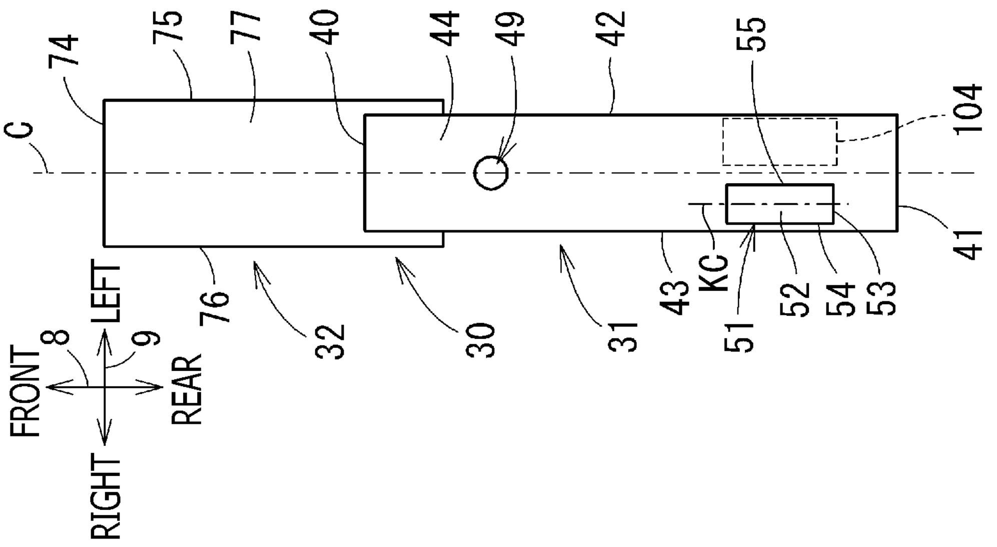
FIGS. 4A-4C are plan views of recesses 104 and a cartridge set including the ink cartridge 30 and an ink cartridge 30A.
Figure 4B:
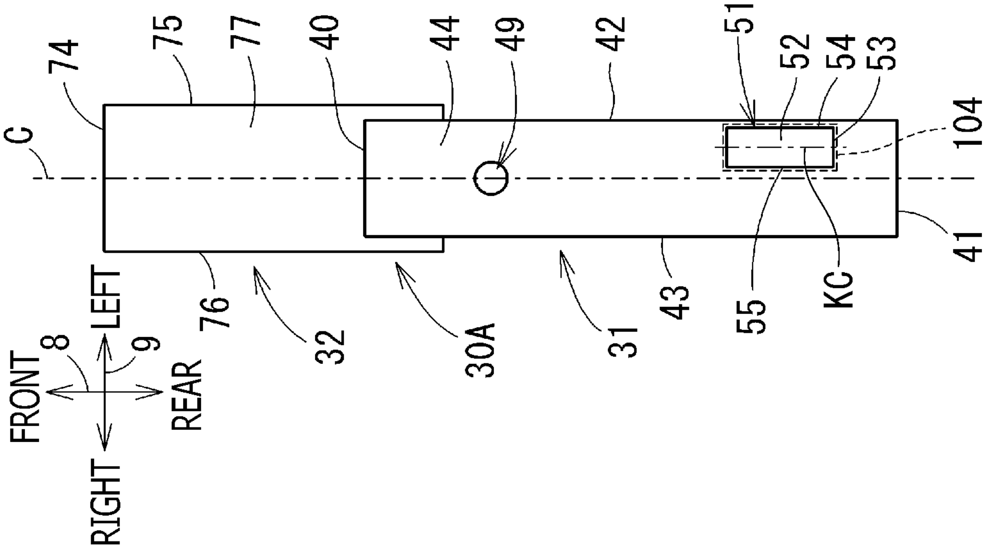
Figure 4A:
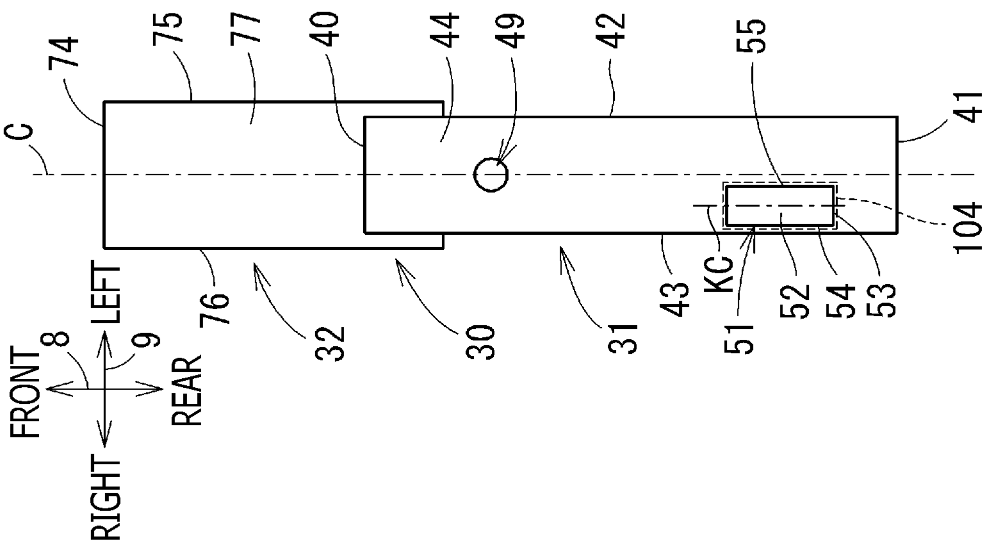

For example, if the ink cartridge 30 with the key member 51 located at the rightward offset position is inserted in the cartridge case 101 having the recess 104 shown in FIG. 4B, the key member 51 may not face the recess 104 in the up-down direction 7, as shown in FIG. 4C. Therefore, when the ink cartridge 30 is inserted in the cartridge case 101 with the recess 104 shown in FIG. 4B, the key member 51 may not engage with the recess 104. Accordingly, the ink cartridge 30 may not be maintained in the mounted condition.

The cover 32 has a shape of a parallelepiped smaller than the body 31 and has an opening 71 which is open rearward. The cover 32 is attached to the body 31 to cover a part of the front wall 40 of the body 31 higher than the supply port 47. The cover 32 is located frontward with respect to the chamber 46.

The cover 32 has a covering body 72 and extended parts 73L, 73R. The covering body 72 is in a shape of a box having the opening 71 which is open rearward. The covering body 72 has a leftward wall 75 and a rightward wall 76 having the opening 71. The extended parts 73L, 73R extend from a rear end of the leftward wall 75 and a rear end of the rightward wall 76, respectively.

The covering body 72 has a front wall 74, a leftward wall 75 extending rearward from a leftward end of the front wall 74, a rightward wall 76 facing the leftward wall 75 in the right-left direction 9, an upper wall 77 extending rearward from an upper end of the front wall 74, and a lower wall 78 facing the upper wall 77 in the up-down direction 7. An outer surface of the front wall 74 faces frontward. An outer surface of the leftward wall 75 faces leftward. An outer surface of the rightward wall 76 faces rightward. An outer surface of the upper wall 77 faces upward. An outer surface of the lower wall 78 faces downward. The front wall 74, the leftward wall 75, the upper wall 77, and the lower wall 78 define an inner space inside the covering body 72.

A dimension of the covering body 72 along the up-down direction 7 is smaller than a dimension of the body 31 along the up-down direction 7. A dimension of the covering body 72 along the front-rear direction 8 is smaller than a dimension of the body 31 along the front-rear direction 8. A dimension of the covering body 72 along the right-left direction 9 is substantially larger than a dimension of the body 31 along the right-left direction 9.

The extended part 73R extends rearward from the rear end of the rightward wall 76. The extended part 73R has a shape of a plate. In a vertically central area in the extended part 73R, a through hole 79 is formed through in the right-left direction 9. In the through hole 79, the protrusion 50 is inserted. The through hole 79 has a rectangular shape, of which dimensions are greater than external dimensions of the protrusion 50. A dimension of the through hole 79 along the up-down direction 7 is greater than a dimension of the through hole 79 along the front-rear direction 8. The dimension of the through hole 79 in the up-down direction 7 is substantially greater than a dimension of the protrusion 50 along the up-down direction 7. Therefore, the protrusion 50 inserted in the through hole 79 is movable in the up-down direction 7. Although not shown in the drawings, the leftward wall 75 has a through hole 79, which is in the same shape as the through hole 79 on the rightward wall 76.

The leftward wall 75 and the rightward wall 76 face each other in the right-left direction 9. Between the leftward wall 75 and the rightward wall 76, the body 31 is inserted. With the protrusion 50 located on the leftward wall 75 of the body 31 being inserted in the through hole 79 in the extended part 73L, and the protrusion 50 located on the rightward wall 76 of the body 31 being inserted in the through hole 79 in the extended part 73R, the cover 32 may be attached to the body 31. The cover 32 is, in the state where the cover 32 is attached to the body 31, movable in the up-down direction 7 with respect to the body 31 within the range, in which the protrusions 50 are movable in the up-down direction 7 in the through holes 79.

The cover 32, in the state where the cover 32 is attached to the body 31, covers a part of the front wall 40, including an upper part of the front wall 40, of the body 31. The outer surface of the front wall 74 of the cover 32 is located frontward with respect to the supply port 47. The supply port 47 is located at a position lower than a lower end of the opening 71 in the cover 32.

Benefits

According to the ink cartridge 30 described above, if the key member 51 is located at a position displaced from the recess 104 when the operator attempts to insert the ink cartridge 30 into the cartridge-mountable compartment 110 by pushing the rear wall 41 of the ink cartridge 30, the key member 51 may not engage with the recess 104. Therefore, the operator working to mount the ink cartridge 30 in the cartridge-mountable compartment 110 may immediately recognize that the mounted position in the cartridge-mountable compartment 110 for the ink cartridge 30 is incorrect. On the other hand, if the key member 51 engages with the recess 104, the operator may immediately recognize that the ink cartridge 30 is mounted at the correct position in the cartridge-mountable compartment 110.

In the state where the key member 51 and the recess 104 are engaged, the locking surface 53 of the key member 51 contacts the wall surface 106 of the recess 104. Therefore, the ink cartridge 30 may be restrained from being falling rearward from the cartridge-mountable compartment 110. Thus, the key member 51 may not only serve as a physical key to engage with the recess 104 but also lock the ink cartridge 30 to stay in the cartridge case 101 without falling rearward. Accordingly, compared to an ink cartridge, in which a member to restrict the ink cartridge from falling rearward is provided separately from the key member 51, the ink cartridge 30 may be downsized.

Moreover, the key member 51 is located at the position offset from the center line C in the right-left direction 9 of the ink cartridge 30. Therefore, the key member 51 may function as the physical key more effectively.

Moreover, the key member 51 is movable in the up-down direction 7 to engage with the recess 104. Therefore, the key member 51 may function as the physical key more effectively.

Moreover, the locking surface 53 of the key member 51 may contact the wall surface 106 of the recess 104. Therefore, in the state where the key member 51 and the recess 104 are engaged, the key member 51 may function to lock the ink cartridge 30 more effectively to stay in the cartridge case 101 without falling rearward.

Moreover, the key member 51 is located at the position rearward and higher with respect to the cover 32. Therefore, the operator may place the key member 51 to engage with the recess 104 and disengage the key member 51 from the recess 104 easily.

Moreover, the key member 51 is located on the outer surface, i.e., the upper surface, of the upper wall 44 of the body 31. Therefore, the structure, in which the key member 51 is engageable with the recess 104, may be created in the printer 10 easily. Furthermore, the ink cartridge 30 may be downsized in the right-left direction 9.

Moreover, the supply port 47 is located in the outer surface, i.e., the front surface, of the front wall 40 of the body 31. Therefore, when the ink cartridge 30 is inserted frontward into the cartridge-mountable compartment 110, the supply port 47 may be located at the correct position to connect to the ink needle 102 easily.

Moreover, the key member 51 is located rearward with respect to the supply port 47. Therefore, the operator may, by moving the ink cartridge 30 up and down around the supply port 47 with the ink needle 102 poked therein, adjust the position of the key member 51 to engage with the recess 104 and disengage the key member 51 from the recess 104 easily.

Moreover, the key member 51 protrudes outward from the outer surface of the body 31. Therefore, the structure, in which the key member 51 is engageable with the recess 104, may be created in the printer 10 easily.

While the invention has been described in conjunction with various example structure outlined above and illustrated in the figures, various alternatives, modifications, variations, improvements, and/or substantial equivalents, whether known or that may be presently unforeseen, may become apparent to those having at least ordinary skill in the art. Accordingly, the example embodiment of the disclosure, as set forth above, is intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

Modified Example

Figure 5:
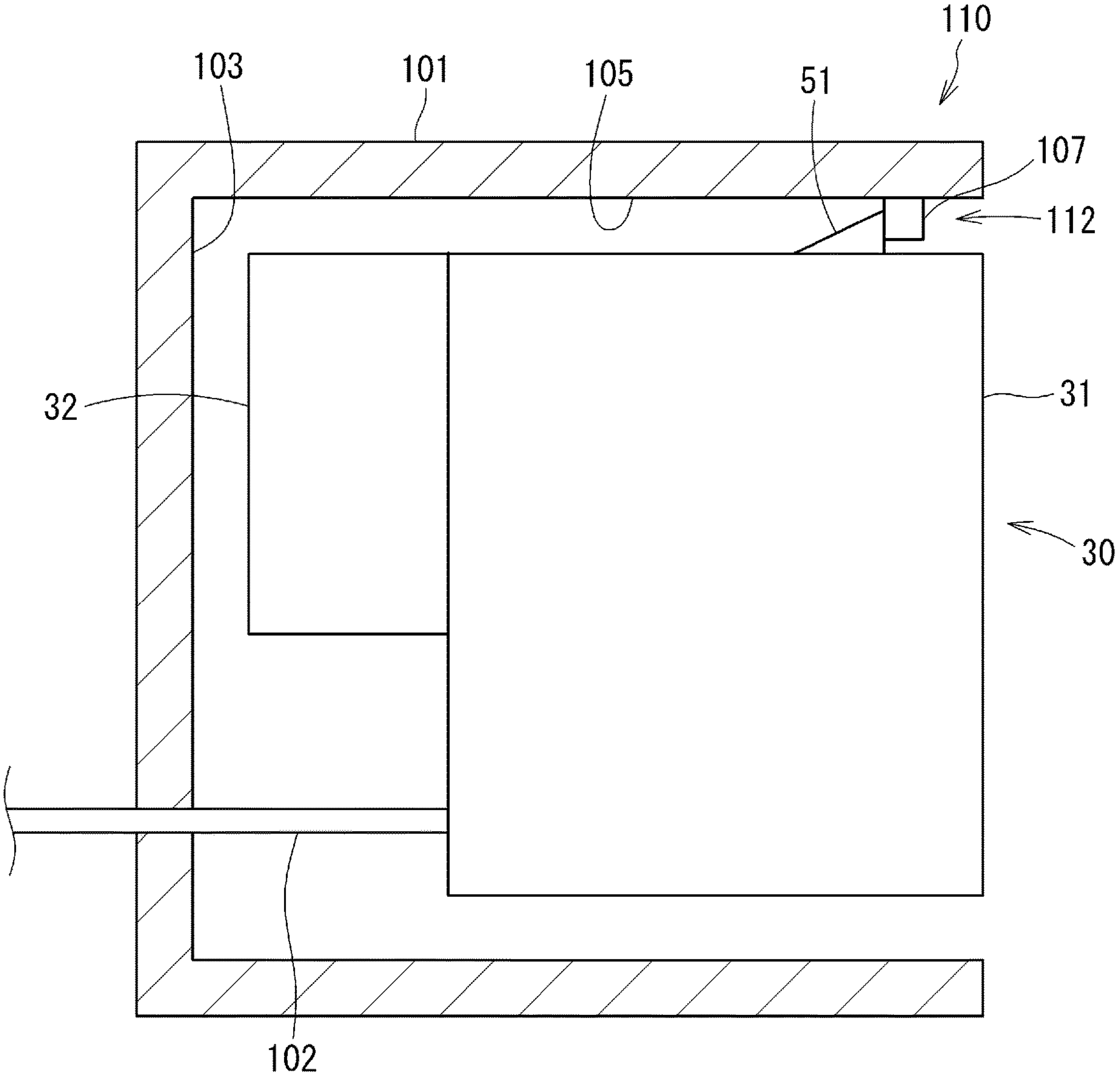
FIG. 5 is a schematic cross-sectional view of another ink cartridge 30 and a cartridge-mountable compartment 110.

For example, the cartridge-mountable compartment 110 may not necessarily have the recess 104 but may have a protrusion 107 protruding downward from the ceiling 105 of the cartridge-mountable compartment 110 to engage with the key member 51, as shown in FIG. 5.

Figure 6:
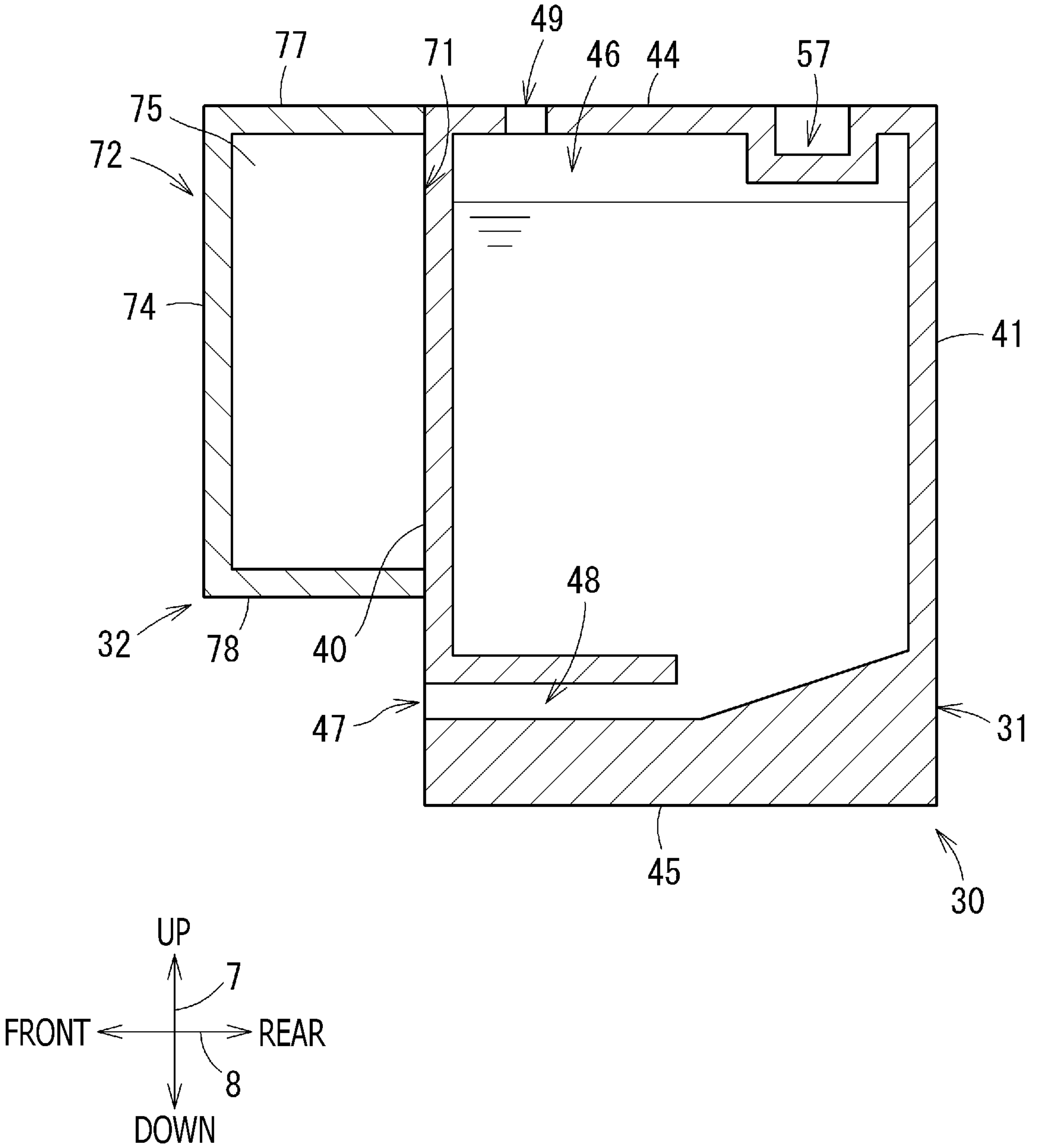
FIG. 6 is a cross-sectional view of another ink cartridge 30.

For another example, the key member 51 may not necessarily protrude upward from the upper wall 44 but may have a dent 57, as shown in FIG. 6, which is dented downward from the upper wall 44. In this arrangement, the cartridge-mountable compartment 110 may have the protrusion 107 including a leaf spring, which may resiliently deform in the up-down direction 7. For inserting the ink cartridge 30 into the cartridge-mountable compartment 110, the protrusion 107 contacting the upper wall 44 of the body 31 may resiliently deform, and when the dent 57 and the protrusion 107 face each other in the up-down direction 7, the protrusion 107 may resiliently recover to enter the dent 57 and engage with the dent 57. For another example, the key member 51 and the dent 57 may be located on the leftward wall 42, the rightward wall 43, or the lower wall 45.

In these arrangements, the recess 104 or the protrusion 107 may be located at positions corresponding to the key member 51 or the dent 57.

Figure 7:
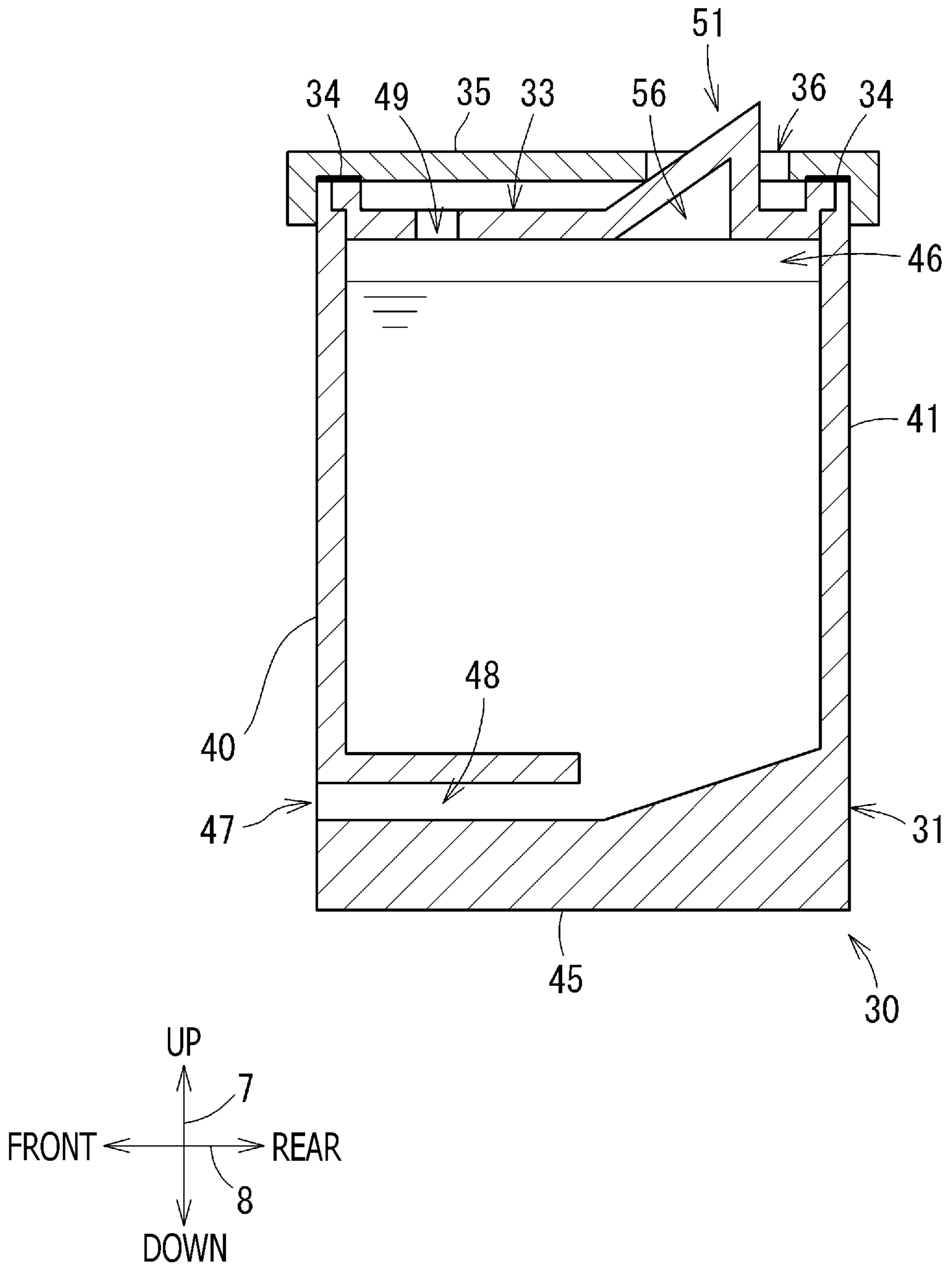
FIG. 7 is a cross-sectional view of another ink cartridge 30.

For another example, the body 31 may not necessarily be formed in one piece integrally but may be composed of a plurality of parts made of synthetic resin. For example, as shown in FIG. 7, the body 31 may not necessarily have the upper wall 44 but may have an opening on the upper side. The opening may be covered by an inner lid 33 and may be sealed by a film 34. In this arrangement, the cover 32 may not be provided. Further, an upper cover 35 may be fitted on the body 31 so that an upper side of the inner lid 33 may be covered by the upper cover 35. In this arrangement, the key member 51 may be located in the inner lid 33 and may be exposed outward through a through hole 36 in the upper cover 35. Moreover, the air release path 49 may be located in the inner lid 33.

Figure 8:
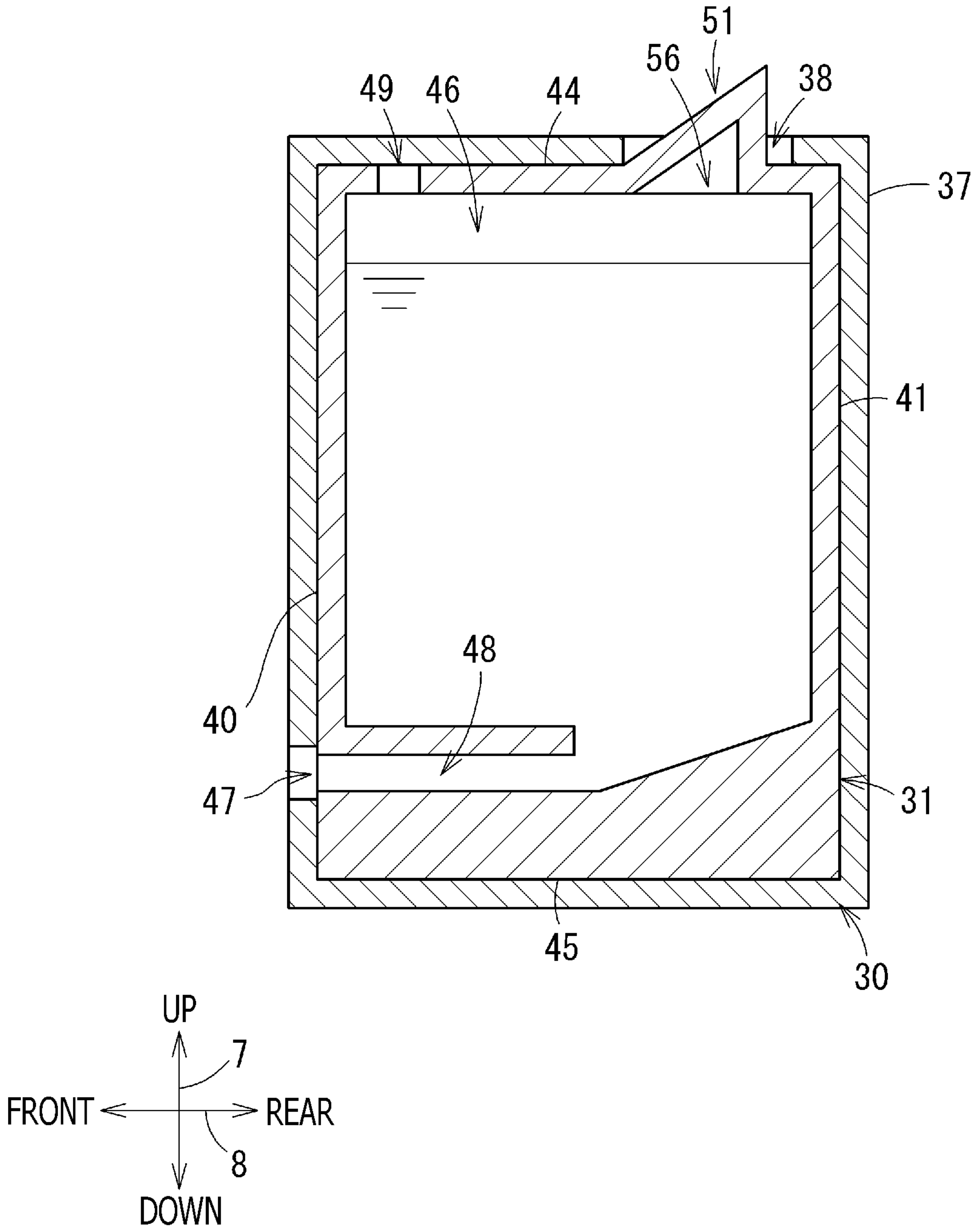
FIG. 8 is a cross-sectional view of another ink cartridge 30.

For another example, as shown in FIG. 8, the ink cartridge 30 may have a cover 37 in place of the cover 32 that may enclose the body 31 entirely. In this arrangement, the key member 51 may be exposed outward through a through hole 38 in the cover 37.

For another example, the key member 51 may not necessarily be formed integrally with the body 31 or may not necessarily have the inner space 56 inside thereof. For example, the key member 51 may be located separately from the body 31, and/or the inner space 56 may not necessarily be created in the key member 51. For example, in the arrangement shown in FIG. 3, the key member 51 may rather be a protrusion having no inner space 56. For another example, in the arrangement shown in FIG. 7, the key member 51 may be located not on the body 31 but on the upper cover 35 as a protrusion having no inner space 56. In this arrangement, the upper cover 35 may not have the through hole 36. Moreover, in the arrangement shown in FIG. 7, the key member 51 may be located on the inner lid 33 or the body 31 as a protrusion having no inner space 56. For another example, in the arrangement shown in FIG. 8, the key member 51 may be located not on the body 31 but on the cover 37 as a protrusion having no inner space 56. In this arrangement, the cover 37 may not have the through hole 38. For another example, in the arrangement shown in FIG. 8, the key member 51 may be located on the body 31 as a protrusion having no inner space 56.

For another example, the key member 51 may not necessarily be located at different positions only in the right-left direction 9 but may be located at different positions also in the up-down direction 7 and/or the front-rear direction 8, and/or an exterior shape of the key member 51 may be varied depending on the type of the ink to be contained in the ink cartridge 30. For another example, the positions and the shapes of the key member 51 may not necessarily be limited to two (2) but may be three (3) or more.

For another example, the ink cartridge 30 may not necessarily have the cover 32.

For another example, the air release path 49 may not necessarily be located in the upper wall 44 but may be located in the front wall 40. In this arrangement, the air release path 49 on the outer surface of the front wall 40 is open frontward. Optionally, the opening of the air release path 49 may be covered by the cover 32.

For another example, the supply port 47 may not necessarily be located in the front wall 40 of the body 31, but the ink cartridge 30 may have a supplying portion, which protrudes frontward from the front wall 40, and an ink flow path 48 may be located inside the supplying portion. The supply port 47 may be located at a tip of the supplying portion.

For another example, the exterior shapes of the body 31 and the cover 32 may not necessarily be limited to the parallelepiped or boxed shapes. For example, the body 31 may have a protrusion, and the like, through which the operator may handle the ink cartridge 30. For another example, the chamber 46 may have a detecting device that may detect the ink in the chamber 46. Similarly, the cover 32 may have a protrusion, and the like, through which the operator may handle the cover 32.

For another example, the cover 32 may not necessarily be attached to the body 31 by the protrusions 50 being inserted in the through holes 79 in the cover 32, but the structure to attach the cover 32 to the body 31 may be replaced with another attachable structure.

For another example, the printing agent to be stored in the body 31 may not necessarily be limited to the ink. A printing agent other than the ink, such as a preprocessing liquid to be applied to the sheet before the ink is discharged at the sheet, toner, and the like, may be contained in the body 31.

For another example, the printer 10 may be operable with an ink cartridge set, which includes a plurality of ink cartridges 30, 30A mountable in the cartridge-mountable compartment 110. In other words, a plurality of ink cartridges 30, 30A, each of which contains ink in a different color, may be mounted in the cartridge-mountable compartment 110 and connected to the recording head 21 through a plurality of ink tubes 20, and the printer 10 may record a multicolored image on a sheet. In this arrangement, the key members 51 of the ink cartridges 30, 30A may be located at different positions in the right-left direction 9 from one another on the upper walls 44 depending on the colors of the respective inks contained therein. In this arrangement, the operator working to mount the ink cartridges 30, 30A in the cartridge-mountable compartment 110 may recognize that the mounted positions in the cartridge-mountable compartment 110 for the ink cartridges 30, 30A are correct or incorrect immediately.

What is claimed is:

1. A cartridge configured to be inserted in a first direction into a case, the case having a plurality of engagement portions, the cartridge comprising:

a body having a chamber for storing a printing agent; and a key member located on the body at a position associated with a type of the printing agent stored in the chamber, the key member being configured to engage with a corresponding one of the plurality of engagement portions of the case, the key member having a surface facing a second direction opposite to the first direction, the surface being configured to contact the corresponding one of the plurality of engagement portions.

2. The cartridge according to claim 1, wherein a center line of the key member in a first intersecting direction, the first intersecting direction intersecting with the first direction, is located at a position offset from a center line of the body in the first intersecting direction.

3. The cartridge according to claim 2, wherein each of the plurality of engagement portions is a recess recessed in a second intersecting direction, the second intersecting direction intersecting with the first direction and with the first intersecting direction.

4. The cartridge according to claim 2, wherein the surface of the key member facing the second direction is configured to contact a wall of the corresponding one of the plurality of engagement portions.

5. The cartridge according to claim 1, further comprising a cover located on the body, the cover being located apart from the key member in the first direction, wherein, when the cartridge is at a position inserted in the case, the key member is located above the cover in a vertical direction.

6. The cartridge according to claim 5, wherein the body has an upper surface, and the key member is located on the upper surface of the body.

7. The cartridge according to claim 1, wherein the body has a supply port, the supply port being open frontward in the first direction when the cartridge is at a position inserted in the case.

8. The cartridge according to claim 7, further comprising a closing member configured to close the supply port of the body.

9. The cartridge according to claim 7, wherein the key member is located apart from the supply port in the second direction.

10. The cartridge according to claim 1, wherein the key member protrudes from an outer surface of the body.

11. A system comprising:

a case having a plurality of engagement portions; and a cartridge configured to be inserted in a first direction into the case, the cartridge including:

a body having a chamber for storing a printing agent; and a key member located on the body at a position associated with a type of the printing agent stored in the chamber, the key member being configured to engage with a corresponding one of the plurality of engagement portions, the key member having a surface facing a second direction opposite to the first direction, the surface being configured to contact the corresponding one of the plurality of engagement portions.

12. A cartridge set including a first cartridge and a second cartridge, the first cartridge and the second cartridge being configured to be attached to a case having a first engagement portion and a second engagement portion, wherein the first cartridge includes:

a first body having a first chamber for storing a printing agent;

a first upper wall located above the first chamber in a height direction;

a first supply port being open in a frontward direction when the first cartridge is attached to the case, the frontward direction being perpendicular to the height direction; and a first key member located on the first body at a position associated with a type of the printing agent stored in the first chamber, the first key member having a first engagement surface configured to engage with the first engagement portion of the case, the first engagement surface being located at the first upper wall and facing rearward opposite to the frontward direction, the second cartridge includes:

a second body having a second chamber for storing a printing agent different from the printing agent stored in the first chamber of the first body;

a second upper wall located above the second chamber in the height direction, a second supply port being open in the frontward direction when the second cartridge is attached to the case; and a second key member located on the second body at a position associated with a type of the printing agent stored in the second chamber, the second key member having a second engagement surface configured to engage with the second engagement portion of the case, the second engagement surface being located at the second upper wall and facing rearward opposite to the frontward direction, each of the first upper wall and the second upper wall has a first side to be located closer to one side of the case than to the other side of the case in a width direction and a second side to be located closer to the other side of the case than to the one side in the width direction when the first cartridge and the second cartridge are attached to the case, the width direction being perpendicular to the frontward direction and the height direction, the first key member of the first cartridge is located closer to the first side of the first upper wall of the first cartridge than to the second side of the first upper wall in the width direction, and the second key member of the second cartridge is located closer to the second side of the second upper wall of the second cartridge than to the first side of the second upper wall in the width direction.

13. The cartridge set according to claim 12, wherein the first engagement surface of the first cartridge is located at a position offset from a center line of the first upper wall of the first body toward the first side of the first upper wall in the width direction, and the second engagement surface of the second cartridge is located at a position offset from a center line of the second upper wall of the second body toward the second side of the second upper wall in the width direction.

14. The cartridge set according to claim 12, wherein the first cartridge includes a first protrusion having the first engagement surface and protruding from the first upper wall in the height direction, and the second cartridge includes a second protrusion having the second engagement surface and protruding from the second upper wall in the height direction.

15. The cartridge set according to claim 14, wherein the first protrusion of the first cartridge has a first slant surface inclining with respect to the first upper wall and the first engagement surface such that a front end of the first slant surface is located lower than a rear end of the first slant surface, the second protrusion of the second cartridge has a second slant surface inclining with respect to the second upper wall and the second engagement surface such that a front end of the second slant surface is located lower than a rear end of the second slant surface, the first slant surface of the first protrusion is located closer to the first side of the first upper wall of the first cartridge than to the second side of the first upper wall in the width direction, and the second slant surface of the second protrusion is located closer to the second side of the second upper wall of the second cartridge than to the first side of the second upper wall in the width direction.

16. The cartridge set according to claim 12, wherein each of the first engagement surface of the first cartridge and the second engagement surface of the second cartridge has a third side to be located closer to the one side of the case than to the other side of the case in the width direction and a fourth side to be located closer to the other side of the case than to the one side in the width direction when the first cartridge and the second cartridge are attached to the case, a distance from the second side of the first upper wall to the fourth side of the first engagement surface of the first cartridge in the width direction is greater than a distance from the second side of the first upper wall of the first cartridge to a center line of the first upper wall in the width direction, and a distance from the second side of the second upper wall to the fourth side of the second engagement surface of the second cartridge in the width direction is smaller than a distance from the second side of the second upper wall of the second cartridge to a center line of the second upper wall in the width direction.

* * * * *